Figure 1:
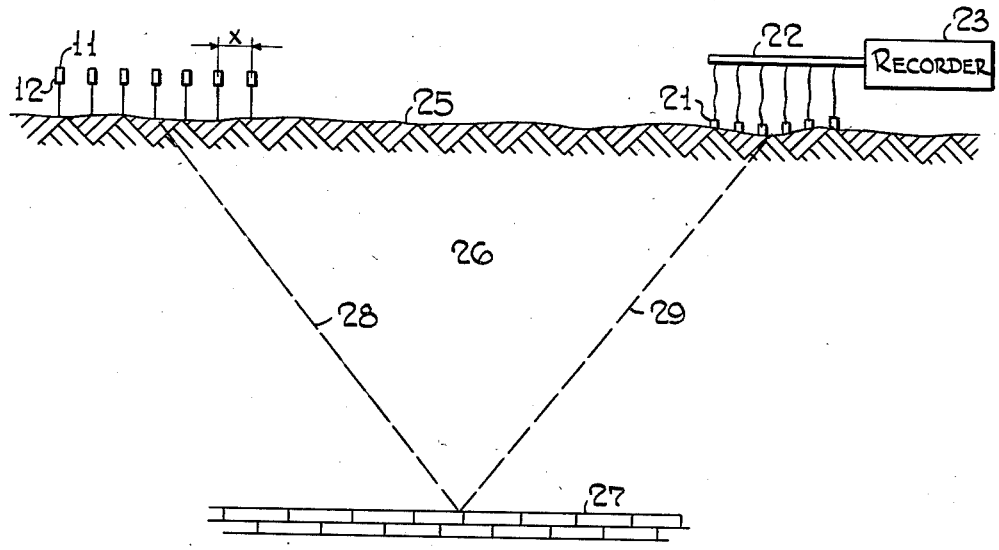

April 12, 1955

J. F. BAYHI 2,706,011

SEISMIC EXPLORATION WITH SHOTS ABOVE GROUND

Filed July 27, 1950

5 Sheets-Sheet 1

Joseph F. Bayhi  Inventor

By W. O. J. Heilman  Attorney

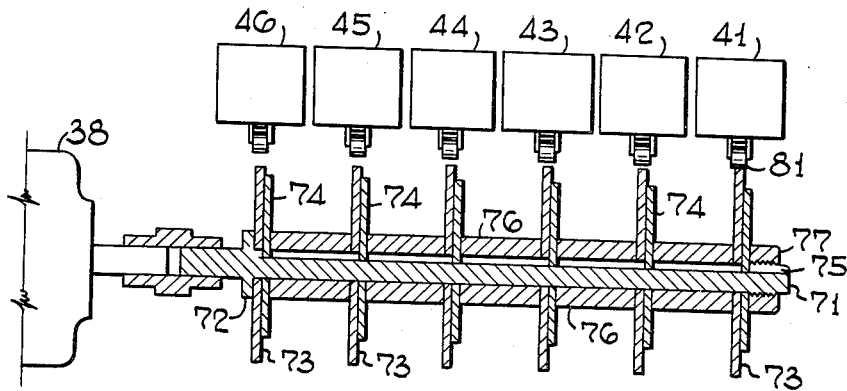
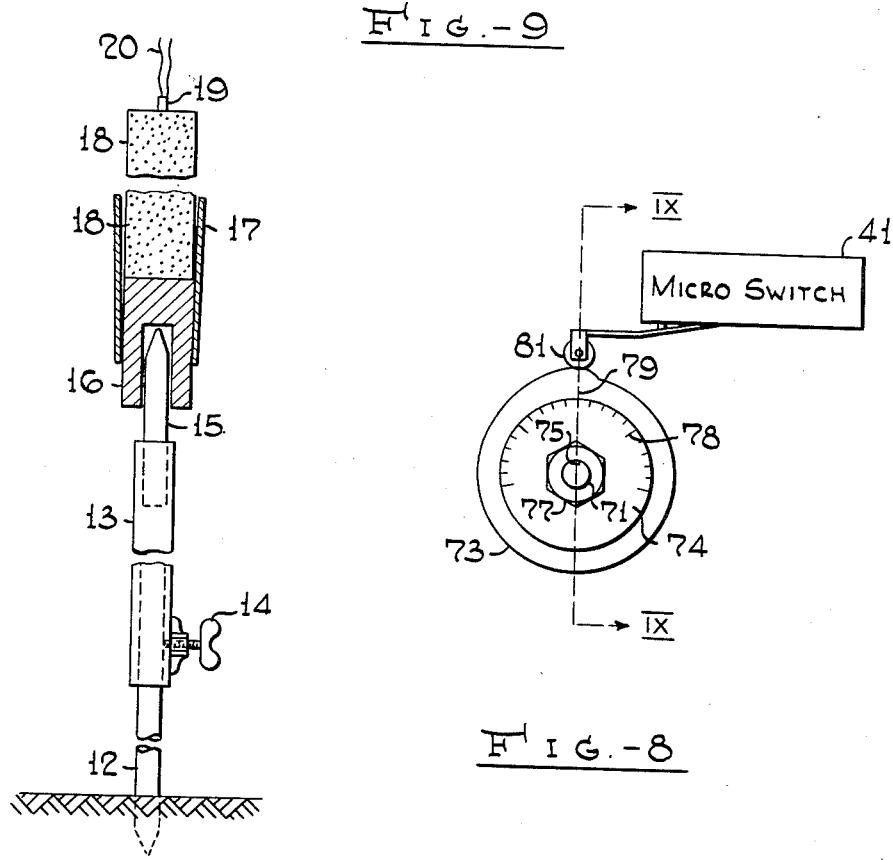

Joseph F. Bayhi  Inventor
By W. O. T Heilman  Attorney

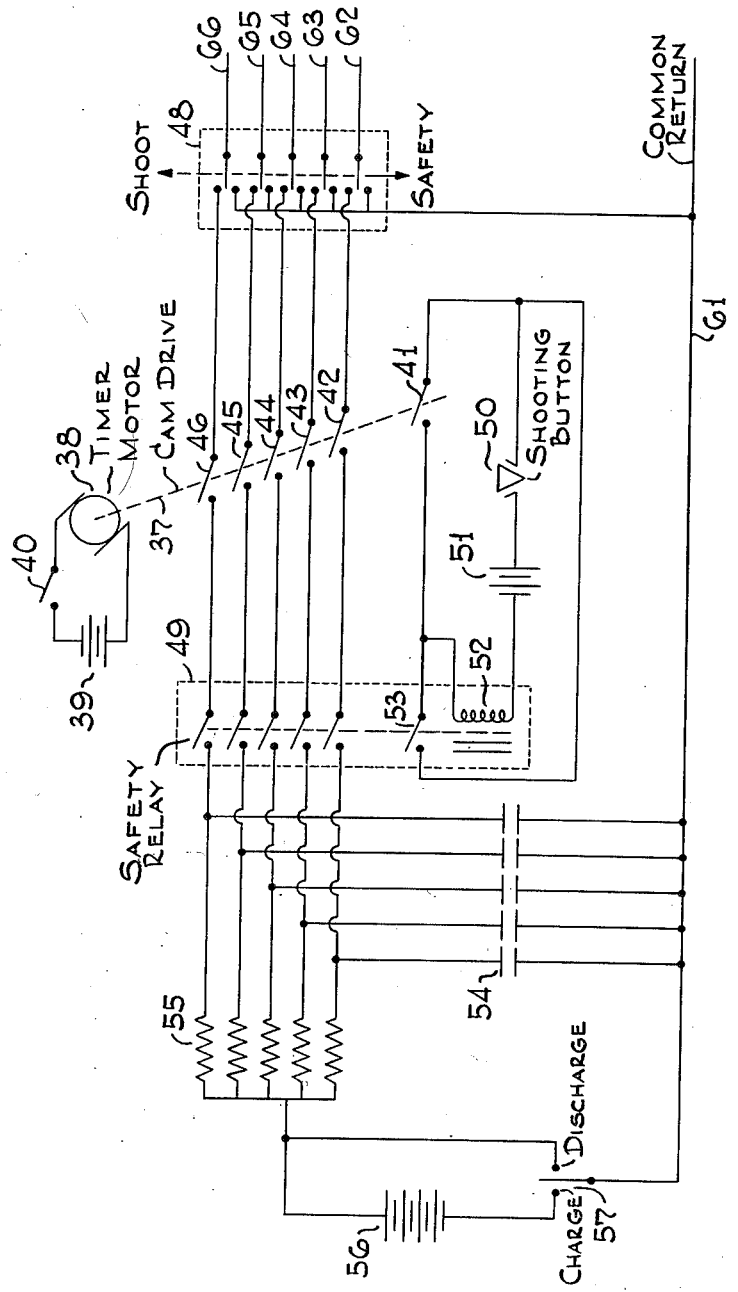

United States Patent Office 2,706,011
Patented Apr. 12, 1955

2,706,011

SEISMIC EXPLORATION WITH SHOTS ABOVE GROUND

Joseph F. Bayhi, Tulsa, Okla., assignor to Esso Research and Engineering Company, a corporation of Delaware Application July 27, 1950, Serial No. 176,233

1 Claim. (Cl. 181—0.5)

This invention relates to improved shooting methods for use in seismic surveying. More particularly it concerns improvements in the art of seismic exploration wherein a plurality of explosive shots in a selected pattern are detonated above the surface of the ground and adjacent thereto whereby energy is directed into the ground to generate a seismic pulse of controlled frequency and direction of travel.

A method commonly employed for prospecting for oil or other mineral deposits is that known as seismic prospecting wherein an explosive charge is detonated in a shot hole and the motion of the earth from the resulting seismic disturbance is detected at a number of points spread out in a desired pattern from the shot hole, sensitive pickups or geophones being employed to translate the detected motion into electrical impulses which after suitable amplification are recorded on a seismograph. Conventionally, a seismograph record is obtained by means of a number of moving coil galvanometers each one of which has a mirror attached thereto, the mirrors being arranged in such relation to a source of light and a moving strip of sensitized paper or film that there will be recorded on the paper or film a plurality of wave forms or traces representative of the seismic waves that have been picked up by the individual geophones, suitably amplified, and fed to the galvanometers. The strip of paper or film is moved longitudinally at a substantially constant speed and is provided by well known means with suitable timing marks so that when the seismograph record or seismogram is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depths of the various reflecting substrata.

It has recently been reported that more effective results can often be obtained in seismic prospecting if the seismic shock is initiated by detonating a plurality of explosive charges positioned above the earth's surface but in close proximity thereto, say at about 6 to 10 feet above the surface, the charges normally being arranged in symmetrical patterns such as hexagons, star shaped patterns and the like. This method is known by the general term of air shooting and has been described, for example, by T. C. Poulter in Geophysics, vol. 15, page 18 (April 1950).

Although the air shooting technique has enabled seismic prospecting crews to obtain reflection records indicative of underlying strata that could not previously be obtained satisfactorily in the same areas with the older methods wherein the seismic energy was obtained from a shot placed in a shot hole bored in the ground, yet in many instances the air shooting technique has left much to be desired. For example when the recommended hexagonal or star shaped patterns have been used for the plurality of explosive shots the signal-to-noise ratio on the seismograph record has often been too high to give a usable or reliable record. Also, in many instances, shear waves generated near the seismic source and traveling horizontally through the earth to the seismic detectors often interfere seriously with obtaining a usable record.

It is an object of the present invention to provide a shot pattern and method of air shooting in seismic prospecting that will overcome or at least minimize the disadvantages of the air shooting methods heretofore proposed.

In accordance with this invention greatly improved results are obtained in the air shooting type of seismic prospecting if the plurality of shots are arranged in a substantially straight line that is essentially coincident with the line of spread of the seismic detectors. Especially desirable results are obtained if the shots are arranged in patterns of variable height as will hereinafter be described.

Figure 4:
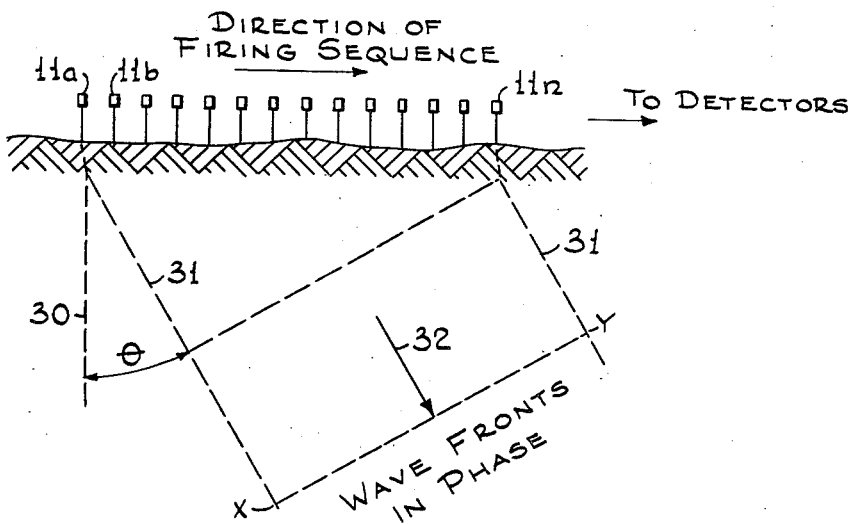
Figure 3:
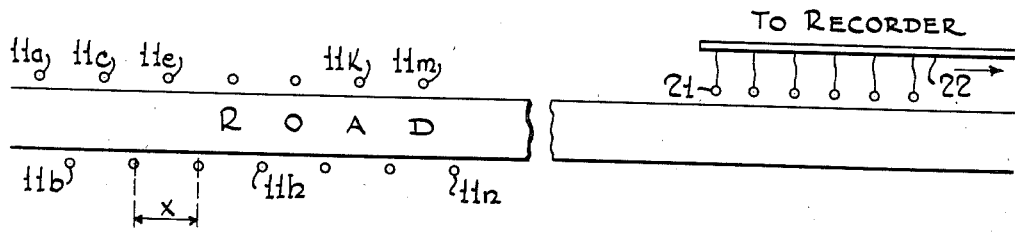
Figure 5:
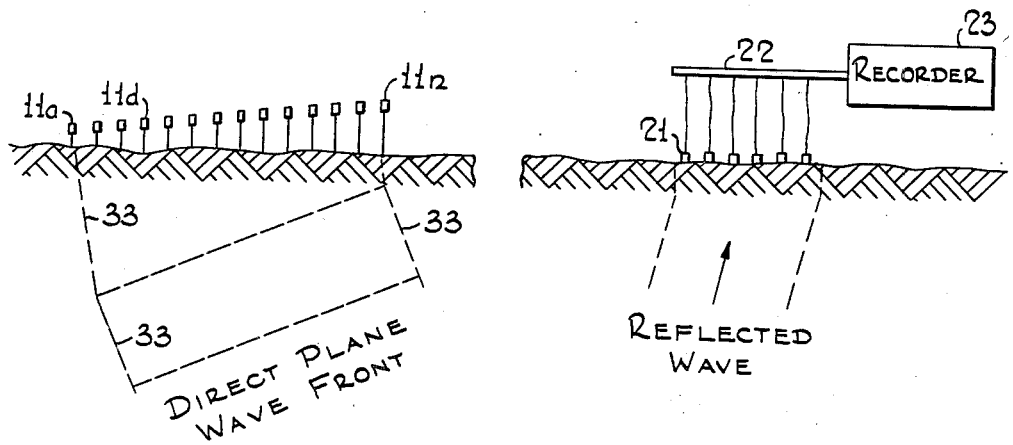
Figure 6:
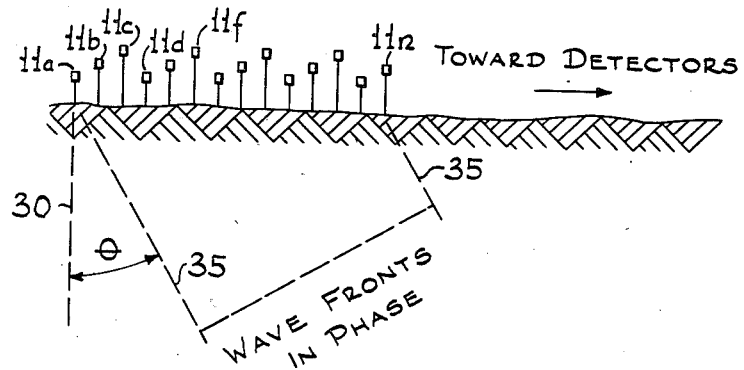
Figure 10:
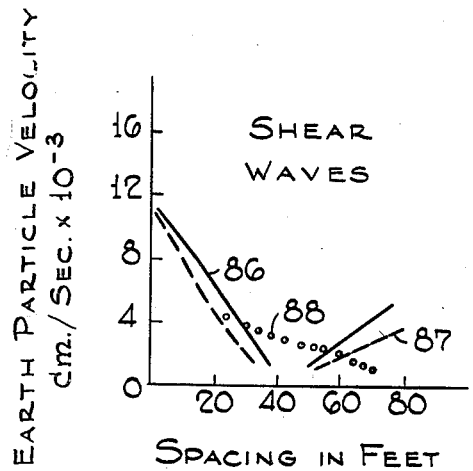
Figure 11:
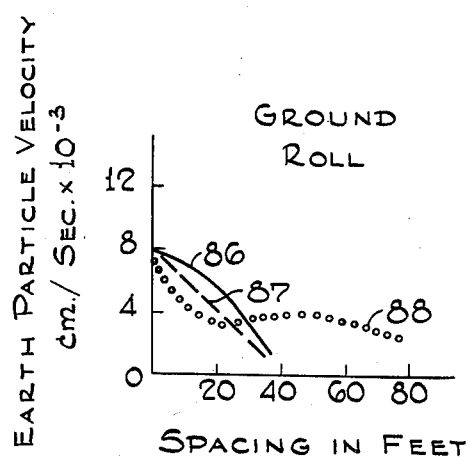
Figure 12:
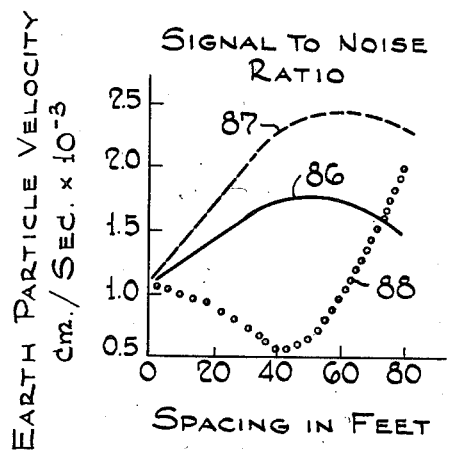
Figure 13:
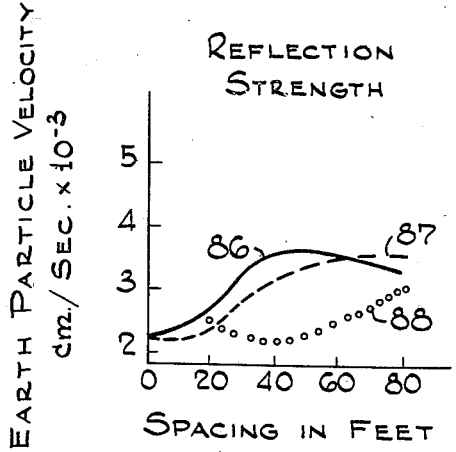

The nature and objects of the invention and the manner in which it is to be performed will be clearly understood from the following description and the accompanying drawings in which Fig. 1 is a diagrammatic representation of the general arrangement of the air shot pattern of this invention in relation to a section of the earth being prospected and a spread of geophones arranged to detect reflected seismic waves. Fig. 2 is an elevational view showing one means for supporting the explosive shots at desired heights above the ground. Fig. 3 is a plan view illustrating a method of staggering the charges of an in-line pattern to obtain increased effectiveness. Fig. 4 is a diagrammatic representation of one method that may be employed for directing seismic energy along a selected path for optimum reflection from underlying strata. Fig. 5 shows a preferred arrangement of the pattern of air shots for effecting directional travel of seismic waves. Fig. 6 illustrates a modification of the preferred arrangement of Fig. 5. Fig. 7 is a diagram of one circuit suitable for firing the charges of an air shot pattern in a desired sequence. Fig. 8 and Fig. 9 are an end view and a sectional side view of one type of cam drive suitable for use in closing the shooting switches of Fig. 7. Fig. 10 is a graphical comparison of the effect of the conventional hexagonal air shot pattern and of the in-line pattern of the present invention on the production of shear waves. Fig. 11 is a graphical comparison of the effect of the two methods just mentioned on the production of the phenomenon known as "ground roll." Fig. 12 is a graphical comparison of the effect of the two patterns on the signal-to-noise ratio on the seismic records and Fig. 13 is a graphical comparison of the effect of the two patterns on the strength of the reflected energy received.

With particular reference to Fig. 1 a schematic representation of a vertical section of the earth being prospected is shown. A plurality of explosive shots 11 are supported on suitable stakes 12 and arranged in a more or less straight line lying in the same direction as a line of geophones 21 laid along the ground a sufficient distance from the explosive to enable the geophones to detect seismic waves that are reflected upwardly from an underlying stratum 27. The geophones are connected through cable 22 to a multiple channel recorder 23 of the conventional type. When the explosive shots 11 are detonated, seismic energy will travel downwardly through the various layers of the earth 25 and 26 and some of the energy will be reflected upwardly by a highly reflective layer such as 27. That portion of the seismic energy that will reach the geophones 21 will travel in a general direction indicated by dashed lines 28 and 29.

In general the explosive shots 11 should be supported at about 6 to 12 feet above the ground. One method of so supporting the shots is shown in Fig. 2. A stake or rod 12 is driven into the ground and has a tubular extension 13 to permit adjustment of the height of the charge above the ground, a wing-type bolt 14 being provided to prevent slidable movement of tube 13 on stake 12 when the desired height adjustment has been made. Conveniently stake 12 and tube 13 may be made of metal. A short rod 15 with its top rounded as shown is welded or otherwise suitably fastened to the upper end of tubular member 13 and a wooden plug 16 with a hole bored in the bottom is fitted over rod 15. Plug 16 is tapered at the top so that a sleeve 17 of expendable material such as paper or cardboard may be slipped onto it to support a stick of dynamite or other explosive 18. For clarity of illustration plug 16 and sleeve 17 are shown in section. Leads 20 conduct current to a detonator 19 when it is desired to set off the explosion.

For more effective results the distance X between adjacent charges should preferably be ½ or ¼ of the wavelength of a shear wave traveling horizontally through the earth in the particular locality being prospected. This wave length can be determined for each area by setting off a single charge either in the air in the manner described or in a conventional shot hole and determining the seismic wave velocity in the well known manner. By so spacing the charges shear waves and other disturbing waves traveling more or less horizontally from the region of the explosive to the geophones will tend to cancel each other, thus emphasizing the reception of true reflections. Instead of a single line of explosives as shown in Fig. 1 improved results will be obtained by arranging the explosives in two essentially parallel lines substantially aligned with the spread of detectors as shown in Fig. 3. Conveniently the two lines can be set up on either side of a road and it is preferred that the distance X between adjacent shots be ½ of a seismic wave length. For best results the charges in one line $11a$, $11c$, $11e$, etc. are staggered with respect to the charges in the other of the parallel lines $11b$, $11d$, etc. That is to say the charges in one line will be arranged about midway between lines projected through the charges in the other line perpendicular to the parallel lines along which the charges are arranged. Also, for best results the distance between the parallel lines should not be greater than about twice the distance between charges in either of the parallel lines. In addition to giving more satisfactory records this particular arrangement has the further advantage of enabling the shot pattern to be set up along a road rather than in a field, thus normally eliminating the need of obtaining right-of-way permits from land owners in the area being prospected.

In order to control the direction of travel of the seismic waves so that reflection from underlying strata will be more effectively obtained the air shots can be fired in a time sequence so that the charges will be detonated effectively in the direction of the detector spread. As shown diagrammatically in Fig. 4 this will cause the wavefronts from the individual slots $11a$, $11b$, etc. to add in phase in a direction indicated by dashed lines 31. The wavefronts will be in phase along a line XY drawn perpendicular to lines 31 and the maximum energy from the array of shots will lie along line 32 which is a line normal to line XY at its mid-point. The direction of maximum energy travel, which can be represented by an angle $\theta$, defined by line 31 and a vertical line 30, can be controlled by adjusting the firing time interval between charges $11a$ and $11b$, $11d$ and $11c$, etc. The successive firing of the charges can be accomplished by any suitable timing device.

A preferred method of directing the line of travel of maximum energy toward reflecting substrata is shown in Fig. 5 wherein the various shots $11a$, $11b$, etc. are placed at increasingly greater heights from the ground in the direction of the spread of detectors 21. When the plurality of charges are detonated simultaneously the wave front will travel in a generally downward direction and will undergo a bending effect as indicated by the dashed lines 33. This results from the fact that the velocity of travel of energy in the air and in the weathered layer 25 are both lower than the average velocity in the deeper beds 26. The direction of travel of maximum energy can thus be controlled by proper selection of differences in elevation between the successive charges $11a$, $11b$, etc. For example, assuming that for the purpose of calculation the lower velocity layer can be ignored, and that the average energy velocity in the air is 3000 ft. per second and the average velocity in the ground is 10,000 ft. per second, a direction of travel 5° from the vertical could be obtained with 14 charges spaced 20 ft. apart and with charge $11a$ being 5 ft. above the ground, charge $11b$, 5.5 ft., and successive charges increasing in height by ½ ft. so that charge $11n$ would be at a height of 11.5 ft.

Still greater control of direction of travel of the energy can be obtained by employing an air shot pattern in which at least two separate groups of charges are used, each charge in a group being at an increasingly greater elevation toward the spread of detectors, the groups to be fired in a time sequence toward the spread of detectors. A 14-charge in-line pattern of this type is shown in Fig. 6, five separate groups of charges being used. Thus the group comprising charges $11a$, $11b$ and $11c$ will be fired, followed by the group consisting of charges $11d$, $11e$ and $11f$, etc. The direction of travel of maximum energy is represented by dashed lines 35. In this case the direction of travel of maximum energy can be controlled by proper selection of differences in elevation between the successive charges in each group as well as by the firing time between groups. Making the same assumptions are were made above in discussing the pattern of Fig. 5, angular directions of energy travel of 10°, 20° or 30° from the vertical could be made with various group arrangements and firing time sequences of a 14-charge 20-ft. spacing in-line pattern as shown in the following table:

TABLE

| Angle Desired | Elevations in Feet for Charge Nos. | | | | | | | | | | | | | | No. of Groups | Firing Time Between Groups, milliseconds |
|---|---|---|---|---|---|---|---|---|---|---|---|---|---|---|---|---|
| | $11a$ | $11b$ | $11c$ | $11d$ | $11e$ | $11f$ | $11g$ | $11h$ | $11i$ | $11j$ | $11k$ | $11l$ | $11m$ | $11n$ | | |
| 10° | 6 | 7 | 8 | 9 | 10 | 11 | 6 | 7 | 8 | 9 | 10 | 11 | 6 | 7 | 3 | 2 |
| 20° | 6 | 8 | 10 | 6 | 8 | 10 | 6 | 8 | 10 | 6 | 8 | 10 | 6 | 8 | 5 | 2 |
| 30° | 6 | 9 | 12 | 6 | 9 | 12 | 6 | 9 | 12 | 6 | 9 | 12 | 6 | 9 | 5 | 3 |

One suitable circuit for firing the charges in the air shot patterns in sequence is depicted in the diagram of Fig. 7 in which a series of firing switches 42 to 46 are adapted to be closed in rapid sequence by a cam drive 37 operated by a constant speed motor 38. As the switches are closed they furnish current to leads 62 to 66 which are connected to the cap wires on the individual charges in the shot pattern. A safety switch 48 is interposed between switches 42 to 46 and leads 62 to 66. This switch may be a 10 pole double throw heavy duty control switch. It will be seen that when the switch is in the down or safety position the cap wires are short circuited back through the common return lead 61.

In addition a safety relay 49 is interposed between the firing switches 42 to 46 and the source of firing current. For the particular circuit shown in Fig. 7 switch 49 is a 12-pole relay. The source of firing current comprises a plurality of capacitors 54 each having one plate tied to one terminal of a battery 56 through an isolating resistor 55 and its other plate tied to the other terminal of the battery through a double throw switch 57. The latter is kept at the discharge position for safety purposes until shortly before it is desired to fire the charges. The capacitors 54 are also tied to individual poles of the relay switch 49 and to the common return lead 61.

The solenoid 52 of the relay switch 49 is placed in series with a circuit comprising one of the cam operated switches 41, a shooting button 50 and a battery 51. Contact 53 of relay 49 is placed in parallel with switch 41 in this circuit. The cams on cam drive 37 are so set that switch 41 will close first followed by switches 42, 43, etc. in sequence.

When it is desired to fire the charges in the shot pattern, switch 57 is thrown to the charge position so that capacitors 54 will become charged. Then safety switch 48 is thrown to the shoot position and timer motor 38 is started by closing switch 40. Now shooting button 50 is pressed to bring about the firing of the charges. It will be seen that if the shooting button 50 is pressed and the cam associated with switch 41 closes the latter switch, current will flow through solenoid 52 and close relay 49. Then if switches 42 to 46 are closed in succession by the cam drive the individual capacitors 54 will be discharged through leads 62 to 66 and the common return lead 61. It will be noted further that once safety relay 49 has been closed by operation of switch 41 and shooting button 50, current will continue to flow through solenoid 52 as long as button 50 is depressed even though switch 41 is opened again by action of the cam drive.

A suitable cam drive arrangement for closing the switches 41 through 46 in sequence is shown in Figs. 8 and 9 in which Fig. 8 is an end view of the cam drive and in which Fig. 9 is a sectional side view taken along line IX—IX of Fig. 8. A shaft 71 is suitably coupled to the shaft of constant speed motor 38 and carries a plurality of cams 73 which fit slidably on the shaft 71 and which are adapted to actuate micro switches 41 to 46 which are suitably supported above the cams. Conveniently the micro switches are of the type provided with a small wheel 81 which makes for a minimum amount of frictional contact with the face of the cam.

In the embodiment shown the cams slide on to shaft 71 and are separated by spacers 76 which also fit slidably on the shaft. A plurality of scale plates 74 are provided which likewise slide on to shaft 71 and which have key portions that fit into a longitudinal keyway 75 on cam shaft 71. Each scale plate 74 has a scale 78 suitably graduated so that reference mark 79 on the cam can be lined up with one of the scale graduations. Reference mark 79 bears the same angular relation to the raised portion of the cam edge on each of the cams so that it is a simple matter to adjust the relative order in which the various switches are closed and the time intervals between the closing of adjacent switches by lining up the reference marks 79 with the proper graduation on the scale. When the proper settings have been made the cams can be held against rotation with relation to the scale plates by tightening nut 77 on the end of shaft 7. It will be seen that this will cause the assembly of cams, scale plates and spacers to be held tightly against stop 72 on the shaft.

If motor 38 turns shaft 71 at a constant speed of 250 R. P. M. and if the cams 73 are 5" in diameter the cam edges will have a peripheral speed of about 65" per second. This means that for ine millisecond difference in the time of closing of one of the switches the raised portion of the cam edge should be moved 0.065" or about 1/16". The marking off of scale 78 into graduations equivalent to 1/16" adjustment on the periphery of the cam is a relatively simple matter.

The relative efficiency of the in-line patterns of the present invention and of conventional hexagonal air shot patterns were compared in the following tests. In some of these tests in-line patterns of the types shown in Figs. 1 and 3 were set up and in other tests hexagonal patterns of the type shown by T. C. Poulter in Geophysics, April 1950, page 191, were used. About 3000 ft. from the air shot pattern a spread of 6 geophones was set out on the ground in a line directed to the air shot pattern, the geophones being spaced 75 ft. apart. All of the air shot charges were detonated at a height of 8 ft. and the total weight of explosives in each pattern was about 17.5 lbs. Spacings of 20, 40 and 80 ft. between adjacent charges in each air pattern were employed in separate tests. The signals from the geophones were fed through flat response amplifiers to high frequency galvanometers and a high speed camera of the usual type for seismic exploration was employed. The geophones had a natural frequency of 3 cycles per second. The seismograph records obtained from the various tests were examined and earth particle velocities for reflections and for various "unwanted events" were obtained from the records by measuring the amplitudes of the various traces and applying factors for amplifier and geophone sensitivities. The term "unwanted signals" includes horizontally traveling events identified as shear waves and "ground roll," as well as such events as "first kicks" and later refractions. In addition a measurement of signal-to-noise ratio was made of all records. This involved comparison of the average earth particle velocity for the duration of a reflection with the average earth particle velocity for events adjacent to the reflection and was determined as follows: (a) identification of a reflection at about 0.67 second for example was made by the conventional line-up method across the six traces; (b) the average trace amplitude for the duration of the reflection was determined by measurements from a reference base line; (c) the average trace amplitude of signals adjacent to the reflection was determined for the duration 0.60 to 0.70 second by measurements from the same reference line; (d) the ratio of (b) over (c) was termed the signal-to-noise ratio. Obviously a reflection occurring at some other time interval could be chosen for determining the signal-to-noise ratio in the same manner; the reflection at 0.67 second was convenient in this particular instance.

The results obtained are presented in Figs. 10 to 13, inclusive, in the first two of which the spacings of the individual charges in the various patterns are plotted against earth particle velocities for unwanted events, Fig. 10 showing shear wave velocities and Fig. 11 ground roll velocities. Fig. 12 is a plot of signal-to-noise ratio for the various spacings and Fig. 13 is a plot of earth particle velocity for a reflection occurring at about 0.67 second on each record for the various patterns and spacings used. In each of the Figs. 10 to 13, inclusive, solid line 86 is a plot for the seven-shot in-line pattern of Fig. 1, dashed line 87 is a plot for a fourteen-shot parallel in-line pattern of the type shown in Fig. 3 and dotted line 88 is a plot for a thirteen-shot hexagonal pattern.

From the plots of Figs. 10 and 13, it can be concluded that in-line patterns of seismic air shots, particularly the 40 foot spacing pattern, placed in line with the spread of detectors, provide significantly greater reflection signal amplitudes and lower interfering signal amplitudes than do hexagonal patterns having the same number and weight of charges. Similar tests were run in which the in-line patterns of air shots were placed broadside of the spread of detector rather than in line with the detectors. Usable records were not obtained since the signal-to-noise ratios were too low and interfering events on the record were of too great an amplitude.

It is not intended that this invention be limited by any of the specific examples given but only by the following claim.

What is claimed is:

In a system for seismic exploration the combination of a plurality of seismic detectors arranged in a substantially straight line in contact with the earth adjacent the surface thereof, a plurality of explosive charges supported at selected fixed distances above the earth's surface, spaced from each other and from said detectors and disposed in a single line substantially coincident with the line of spread of said detectors, said plurality of explosive charges comprising at least two separate groups of charges, each charge in a group being placed at an increasingly greater elevation toward the detectors, and means for detonating the separate groups in a rapid time sequence toward the spread of detectors, all of the explosive charges within each group being detonated at essentially the same moment.

References Cited in the file of this patent

UNITED STATES PATENTS

| | | |
|---|---|---|
| Re. 17,242 | McCollum | Mar. 19, 1929 |
| 1,782,445 | Rieber | Nov. 25, 1930 |
| 1,899,970 | McCollum | Mar. 7, 1933 |
| 2,133,484 | Sherar | Oct. 18, 1938 |
| 2,232,613 | Klipsch | Feb. 18, 1941 |
| 2,340,314 | Farnham | Feb. 1, 1944 |
| 2,545,380 | Poulter | Mar. 13, 1951 |
| 2,580,636 | Wolf | Jan. 1, 1952 |

FOREIGN PATENTS

| | | |
|---|---|---|
| 701,747 | France | Mar. 21, 1931 |

OTHER REFERENCES

Boone, "Aerial Explosives," article in Explosives Engineer, January-February 1949, pages 7–10, 27.

Isvetaev (U. S. S. R.), "An Experiment of Air Explosions in Reflection Exploration," article in "Applied Geophsics," 1945, No. 1, pages 82–87.